United States Patent
Appell et al.

[19]

[11] Patent Number: 6,126,549
[45] Date of Patent: Oct. 3, 2000

[54] COUPLING DEVICE

[75] Inventors: Bo Appell; Curt Falk, both of Hudiksvall, Sweden

[73] Assignee: Voith Safeset AB, Hudiksvall, Sweden

[21] Appl. No.: 09/077,683

[22] PCT Filed: Dec. 3, 1996

[86] PCT No.: PCT/SE96/01593

§ 371 Date: Jun. 3, 1998

§ 102(e) Date: Jun. 3, 1998

[87] PCT Pub. No.: WO97/21044

PCT Pub. Date: Jun. 12, 1997

[30] Foreign Application Priority Data

Dec. 4, 1995 [SE] Sweden .................................. 9504335

[51] Int. Cl.[7] ................................................... F16D 3/80
[52] U.S. Cl. ............................................... 464/24; 464/32
[58] Field of Search ............................. 464/24, 30, 32, 464/88; 403/2

[56] References Cited

U.S. PATENT DOCUMENTS

| 724,684 | 4/1903 | Edwards | 464/32 |
|---|---|---|---|
| 3,118,027 | 1/1964 | Boyles | 464/24 |
| 3,298,240 | 1/1967 | McDowell et al. | 464/24 |
| 3,373,633 | 3/1968 | Desmond et al. | 464/24 |
| 3,420,072 | 1/1969 | Baier et al. | 464/24 |
| 3,741,521 | 6/1973 | Tatsuno | 403/2 |
| 4,222,246 | 9/1980 | Rongley | 464/30 |
| 4,621,982 | 11/1986 | Schultz et al. | 403/2 |
| 4,752,275 | 6/1988 | Lindenthal et al. | 464/32 |

FOREIGN PATENT DOCUMENTS

| 0 060 402 | 9/1982 | European Pat. Off. . | |
|---|---|---|---|
| 2 341 778 | 9/1977 | France . | |
| 141270 | 5/1903 | Germany . | |
| 3225719 | 1/1984 | Germany | 464/32 |

Primary Examiner—Lynne H. Browne
Assistant Examiner—Greg Binda
Attorney, Agent, or Firm—Jacobson, Price, Holman & Stern, PLLC

[57] ABSTRACT

A coupling arrangement for coupling a driving unit (1) to a driven unit (2) includes a combination of a shear coupling (7) which acts between the units and which fails immediately an overload occurs, and a brake coupling (13) which is adapted to become active between the units (1, 2) when the shear coupling (7) fails.

10 Claims, 1 Drawing Sheet

COUPLING DEVICE

BACKGROUND OF THE INVENTION

1. Field of the Invention

The present invention relates to a coupling arrangement for coupling a driving unit to a driven unit.

2. Description of the Related Art

It is known to mount between driving and driven units different types of couplings which break the connection between said units when overloading occurs. If the driving unit tends to race when the load is disconnected, the revolutionary speeds on the driving side may become so great as to cause damage to the driving unit. For instance, when driving generators with the aid of steam or gas turbines, load peaks occur in the event of phase synchronization errors or short-circuits such as to necessitate the connection between turbine and generator to be broken immediately. However, when a small rotating mass is found on the turbine side of the coupling, the steam or gas turbine that was connected by the coupling may already have been seriously damaged or wrecked before the turbine drive has had time to switch off, i.e. within the space of one-half to one second. In the case of a water turbine that rotates at a speed of 120 rpm, for instance, and drives a generator through gearing at a speed of, e.g., 1500 rpm, the failure of a shear coupling mounted between the gearing and the generator with subsequent racing of the turbine, e.g. to a speed of 240 rpm, can wreck or seriously damage the gearing.

SUMMARY OF THE INVENTION

The object of the present invention is to provide a novel and improved coupling arrangement with which the aforesaid problems are avoided.

To this end, there is proposed a coupling arrangement of the kind defined in the introduction which includes in combination a shear coupling which is active between the units and which fails immediately upon the occurrence of an overload, and a brake coupling which becomes active between the units when the shear coupling fails.

The arrangement proposed in accordance with the invention prevents the rotational speed of the driving unit from increasing excessively when the shear coupling fails, by virtue of the braking effect caused by of the brake coupling, so as to prevent damage and enable operations to be re-commenced after reestablishing the coupling between the units.

The shear coupling may be of any appropriate kind, and may, for instance, have the form of a conventional shear-pin coupling. Shear pins, however, have a tendency to become fatigued and may need replacing at given intervals in order to prevent undesirable failure of the coupling in the event of an overload which lies beneath the intended limit. According to the invention, the shear coupling will preferably comprise a coupling which is fixedly connected to one of said units and which includes a chamber that contains liquid under pressure such as to deform a coupling part into coupling engagement with the other unit, and means which functions to immediately remove the chamber pressure upon relative movement between the coupling and said other unit, so as to release coupling engagement between said other unit and the shear coupling. This type of shear coupling can readily be adapted so as not to be damaged by or cause damage to the units connected thereby, in the event of a coupling failure.

The brake coupling may also be a conventional coupling, for instance in the form of a disc coupling. It will be understood that the coupling discs will suffer considerable wear when the brake coupling is applied and normally it will be necessary to replace the discs after a shear coupling failure. The disc coupling will exert a full braking moment immediately the shear coupling fails, which is not always desirable in practice. According to the invention, the brake coupling will preferably be an hydraulic coupling which is active between the shear coupling on the one side and one of said units on the other side, this unit being disengaged from the shear coupling in the event of an overload. One advantage with this type of coupling is that the braking effect will increase with increasing differences in speed between the driving unit and the driven unit, so as to avoid racing of the driving unit when the shear coupling fails. The hydraulic coupling is not damaged in use. However, the hydraulic fluid may begin to boil and it may therefore be necessary to replace the fluid subsequent to a shear coupling failure.

The arrangement can be used with particular advantage between a driving unit in the form of a gas, steam or water turbine and a load driven thereby, in particular a generator.

BRIEF DESCRIPTION OF THE DRAWINGS

The invention will now be described in more detail with reference to an exemplifying embodiment thereof and with reference to the accompanying schematic drawing, in which.

DETAILED DESCRIPTION OF THE PREFERRED EMBODIMENTS

Figure 1:
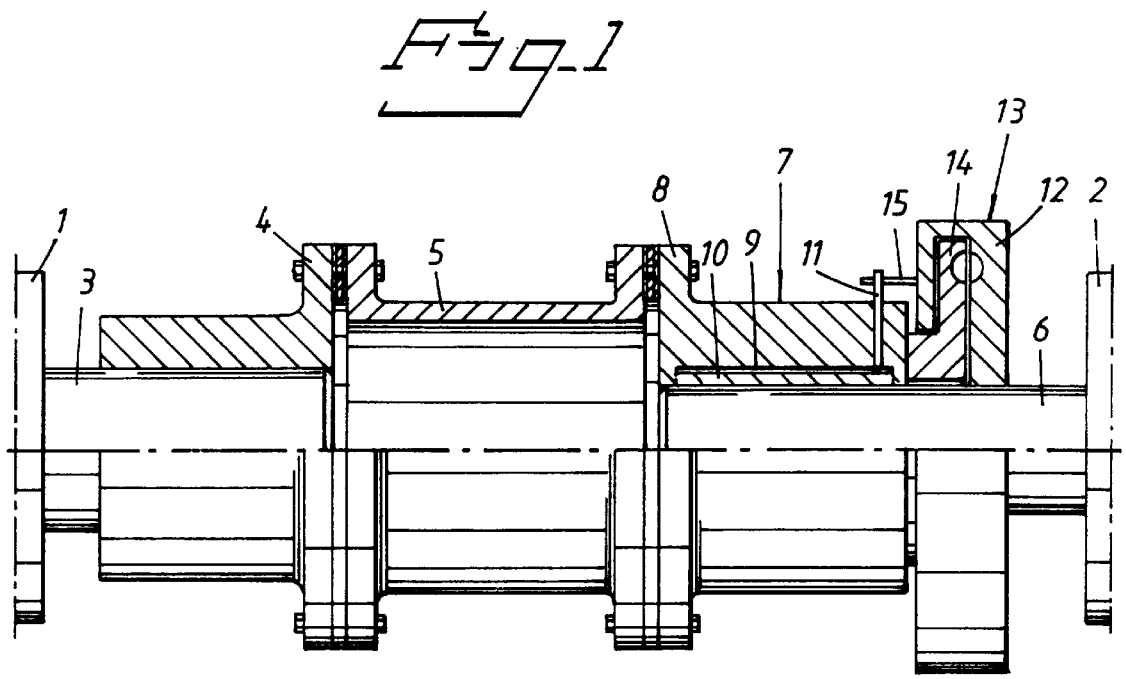
FIG. 1 is a side view, partly in section, of an inventive coupling arrangement.

In FIG. 1, the reference 1 identifies a driving unit, only partially shown, and the reference 2 identifies a driven unit. The output shaft 3 of the driving unit 1 has fixedly mounted thereon a flange 4, to which there is connected a diaphragm coupling 5 whose single purpose in this context is to equalize any alignment error between the output shaft 3 and the input shaft 6 of the driven unit 2. Mounted on the shaft 6 is a shear coupling 7 that includes a fixed flange 8 to which the end of the diaphragm coupling 5 distal from the unit 1 is connected.

The shear coupling 7 includes a cylindrical chamber 9 which has a small radial extension and contains hydraulic fluid under high pressure, said pressurized fluid deforming the inner chamber defining wall 10 into engagement with the shaft 6 and therewith locks the coupling 7 to said shaft. A shear pipe 11 communicates with the chamber 9 and projects radially out from the coupling 7.

The shaft 6 is also firmly connected to one-half 12 of an hydraulic brake coupling 13, the other half 14 of which is fixedly connected to the shear coupling 7. The brake coupling half 12 carries a pin 15 which upon rotation of the shear coupling 7 and the coupling-half 14 relative to the shaft 6 and the coupling-half 12 shears the shear pipe 11, so that the pressure exerted on the shaft 6 through the coupling 7 is immediately relieved and the coupling disengaged from the shaft. Continued rotation of the shaft 3 is therewith transferred to the coupling-half 14 via the diaphragm coupling 5 and the shear coupling 7, wherein rotation of the coupling-half 14 relative to the coupling-half 12 is retarded proportionally to the difference in the rotational speed of the coupling-halves 12, 14 of the hydraulic coupling. Any increase in the speed of the shaft 3 in relation to the speed of the shaft 6 is thus inhibited by the brake coupling 13. Thus, when the unit 1 is a gas turbine and the unit 2 is a generator which due to the occurrence of a phase error in relation to the network or due to a short-circuit generates a load transmission of such magnitude as to cause the shear coupling 7 to fail, the brake coupling 13 will prevent the speed of the gas turbine 1 increasing to an unpermitted high value.

This arrangement enables modern, lightweight and inexpensive gas turbines of high efficiency and small rotating mass to be used to drive generators in a risk-free manner, for instance.

Figure 2:
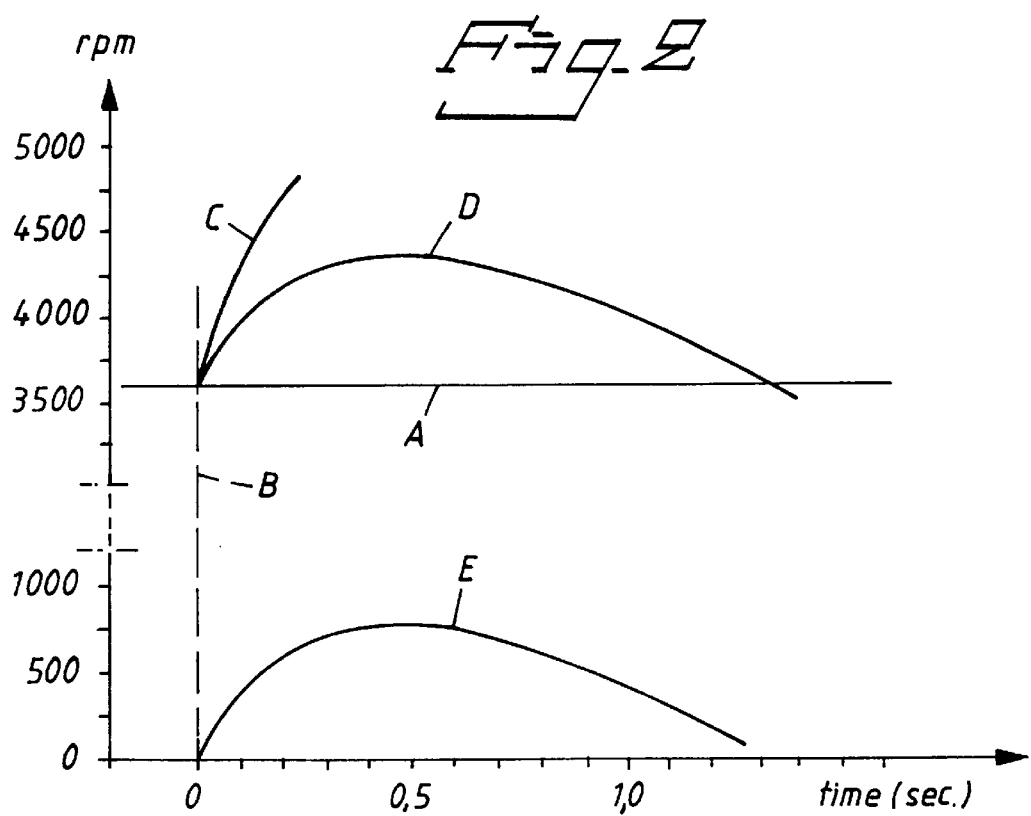
FIG. 2 illustrates diagrammatically the effect of the coupling arrangement in conjunction with a gas-turbine driven generator.

The function of the inventive coupling arrangement is illustrated in FIG. 2, in which the ordinate denotes speeds in rpm and the abscissa denotes time in seconds. The horizontal line A denotes the nominal speed, in this case 3600 rpm, for a gas turbine and for a generator driven via the coupling arrangement illustrated in FIG. 1. The broken line B denotes failure of the coupling arrangement at time point 0. In the absence of the brake coupling 13, the speed of the gas turbine would increase steeply in accordance with curve C despite the gas turbine being disengaged immediately, such high turbine speeds being impermissible and liable to wreck the turbine or necessitate expensive turbine inspection and measuring processes being carried out before the turbine can be put back into use. As a result of the presence of the brake coupling 13, the turbine is braked or retarded so that its speed follows the curve D, the deviation of which from the nominal speed (line A) corresponds to the curve E over the difference in speed between the coupling-halves 12, 14.

As before mentioned, the invention is not restricted to the illustrated and described exemplifying embodiment and modifications and changes can be made within the scope of the inventive concept as defined in the following Claims.

What is claimed is:

1. A coupling arrangement for coupling a driving unit to a driven unit comprising a shear coupling and a brake coupling, said shear coupling fixedly connected to one of said units and having a chamber that contains fluid under high pressure, said fluid deforming a part of said shear coupling into coupling engagement with the other of said units, and means, responsive to relative movement between said shear coupling and the other of said units, for relieving the chamber of pressure and thereby disengaging the coupling engagement of said shear coupling with the other of said units, said brake coupling becoming active between the units upon said coupling disengagement to prevent excessive rotational speed of at least one of the units.

2. The coupling arrangement as set forth in claim 1, said brake coupling having two parts, a first part of said brake coupling fixedly connected to one of said units and a second part of said brake coupling fixedly connected to said shear coupling, such that in normal operation said first part rotates together with said shear coupling and, in response to relative movement between said first part and said shear coupling indicating overload, said first part initiates failure of said shear coupling such that continued rotation of the unit that is fixedly connected to said shear coupling is transferred to said second part of said brake coupling.

3. The coupling arrangement as set forth in claim 2, wherein said brake coupling is a hydraulic coupling, said first part being engaged with said second part through hydraulic fluid.

4. The coupling arrangement as set forth in claim 2, wherein said pressure relieving means is embodied as a shear pipe that communicates with the chamber and projects radially out from said shear coupling, said first part of said brake coupling carrying a pin which, upon rotation of said shear coupling and said second part relative to said first part, shears the shear pipe to thereby relieve pressure in the chamber.

5. The coupling arrangement as set forth in claim 2, said brake coupling being a hydraulic coupling with said first part being engaged with said second part through hydraulic fluid, wherein rotation of said second part relative to said first part upon shear coupling failure is retarded proportionally to a difference in rotational speed of said first and second parts.

6. The coupling arrangement as set forth in claim 1 wherein the driving unit is one of a gas, steam or water turbine, and the driven unit is a generator.

7. A combination of a shear coupling and a brake coupling, said shear coupling for coupling a driving unit to a driven unit and said brake coupling for braking the driving unit upon failure of the shear coupling, comprising:

said shear coupling fixedly connected to said driving unit and having a chamber that contains liquid under high pressure, said liquid deforming a part of said shear coupling into coupling engagement with the driven unit, and means, responsive to relative movement between said shear coupling and said driven unit, for relieving the chamber of pressure and thereby disengaging the coupling engagement of said shear coupling with said driven unit; and said brake coupling adapted to become active between the driving unit and the driven unit upon failure of said shear coupling, a first part of said brake coupling fixedly connected to said driven unit and a second part of said brake coupling fixedly connected to said shear coupling, such that in normal operation said first part rotates together as a unit with said shear coupling, and in response to relative movement between said first part and said shear coupling, said first part initiates failure of said shear coupling, said driving unit being disengaged from said driven unit and continued rotation of said driving unit being transferred to said second part of said brake coupling.

8. The combination as set forth in claim 7, wherein said brake coupling is a hydraulic coupling, said first part being engaged with said second part through hydraulic fluid.

9. The combination as set forth in claim 7, wherein said pressure relieving means is embodied as a shear pipe that communicates with the chamber and projects radially out from said shear coupling, said first part of said brake coupling carrying a pin which, upon rotation of said shear coupling and said second part relative to said first part, shears the shear pipe to thereby relieve pressure in the chamber.

10. The combination as set forth in claim 9, said brake coupling being a hydraulic coupling with said first part being engaged with said second part through hydraulic fluid, wherein rotation of said second part relative to said first part upon shear coupling failure is retarded proportionally to a difference in rotational speed of said first and second parts.

* * * * *